United States Patent Office

3,825,480
Patented July 23, 1974

3,825,480
SONIC ENERGY EXHAUST FILTER
Arnold H. Pelofsky, Monument, Colo. 80132; Dan T. Felix, Pebble Beach Drive, Woodmoor, Monument, Colo. 80132; and Gary N. Herbert, 905 W. Cheyenne Road, Colorado Springs, Colo. 80906
Continuation-in-part of abandoned application Ser. No. 889,779, Dec. 11, 1969, which is a division of application Ser. No. 619,944, Mar. 2, 1967, now Patent No. 3,497,005. This application Dec. 8, 1971, Ser. No. 206,011
Int. Cl. B01j 1/12
U.S. Cl. 204—193                                             6 Claims

ABSTRACT OF THE DISCLOSURE

A process for rupturing molecular bonds in a material using sonic energy. The material is subjected to sonic energy, and in a modification of the process it may be contacted with a carrier agent prior to being subjected to the sonic energy.

---

This is a continuation-in-part of application Ser. No. 889,779 filed Dec. 11, 1969, now abandoned, which in turn is a division of application Ser. No. 619,944, filed on Mar. 2, 1967 and issued on Feb. 24, 1970 as U.S. Pat. No. 3,497,005.

DESCRIPTION OF INVENTION

This invention relates to processes for modifying the molecular structure of materials. More particularly the invention relates to processes for rupturing molecular bonds and forcing chemical reactions by means of sonic energy. The invention has particular application to recovery of shale oil in situ.

Although sonic energy has been used to affect cracking of molecular weight of petroleum products, it has been necessary to cause the reactions to take place in the presence of separate catalytic agents, and at elevated temperatures. For example, in Pat. No. 2,578,377, there is disclosed a hydrocarbon cracking process wherein a catalyst-hydrocarbon mixture is exposed to sonic energy and temperatures in the range of 600–1000° F. Such processes suffer from limitations including high temperature requirements, and further that expensive catalyst must still be used. The hoped for improved efficiency attributable to sonic energy in such processes have not resulted in commercial adaptations thereof.

The present invention provides a method for rupturing and otherwise affecting molecular bonds at temperatures substantially below that of the prior art and further without the necessity for a separate catalyst. The method of this invention is useful for the recovery of shale oil in situ, cracking of crude petroleum oil in the absence of a catalyst, increasing the caloric value of organic fuels, removing pollutant products resulting from the combustion of fuels in combustion engines, causing unique chemical reactions to take place, for mining of metal in metal bearing ores, and secondary recovery of residual petroleum products.

Briefly stated, the present invention includes the process of subjecting materials to the action of sonic energy and in a modification of the process, contacting the materials with a carrier agent prior to the sonic treatment, drawing off a portion of the sonically treated materials, and recovering one of the materials as a product from the removed materials.

DESCRIPTION OF THE PREFERRED EMBODIMENTS

Figure 1:
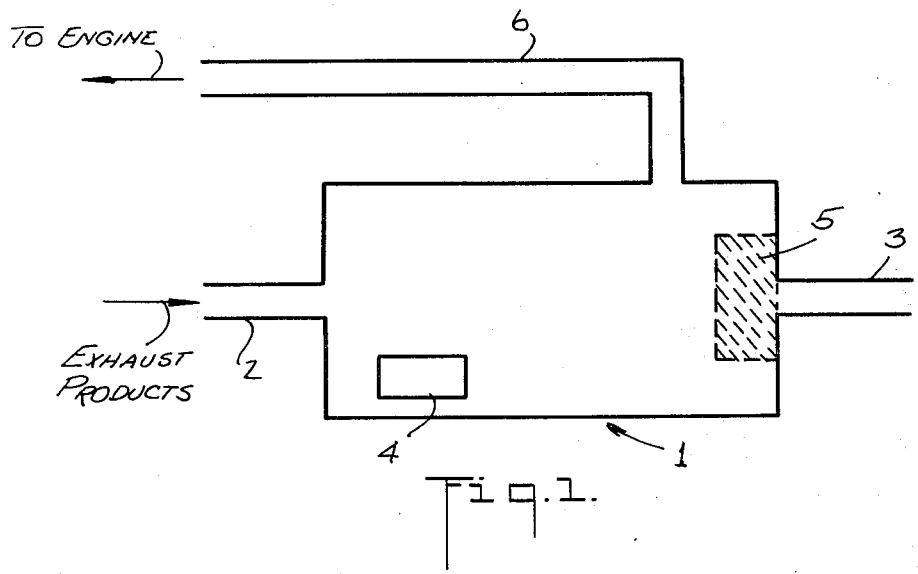
FIG. 1 is a schematic illustrating one preferred embodiment of an apparatus for treating exhaust products of combustion engines according to the invention.

The process has particular utility in the recovery of shale oil in situ and will be described in one embodiment in connection therewith.

Shale oil is similar to petroleum. It includes in its composition hydrocarbons in addition to sulfur-, nitrogen-, and oxygen derivatives of hydrocarbons. Shale oil, however, is more like coal than liquid petroleum in that it is substantially a solid type material with almost no solubility in the common organic solvents nor in inorganic acids, gases, salts, and water. Shale oils are mainly found in subterranean deposits intimately associated with mineral matter. Generally oil shale contains at least 60% mineral matter and in this respect is unlike coal which commonly contains only minor proportions of minerals. The organic components of oil shale is referred to as kerogen and may be pyrolyzed to form a flowable oil. This is the common method for recovery of the petroleum value of shale oil. There is general agreement that if kerogen could be made readily available from oil shale deposits, enough petroleum would be made available for the requirements of approximately the next thousand years.

The process of this invention provides for flooding oil shale deposits with a carrier agent, preferably a liquid in which pyrolyzed products or kerogen are insoluble. Sonic probes are immersed into the shale layer and actuated to transmit sonic energy. A portion of the added agent is removed and treated to separate petroleum products which are suspended kerogen and pyrolyzed kerogen products. In the preferred embodiment of this invention, a continuous stream of the materials comprising the hydrocarbon fraction and the carrier agent, are removed, treated to remove the hydrocarbon product, and the agent recycled to the oil shale deposit for additional treatment in a continuous operation.

As to the carrier agent added to the oil shale deposit the preferred and most economical material is water which may be indigenous to the area, such as spring water or a saline or brine solution. Other agents include miscible materials and solvents, such as acetic acid, nitric acid, aqua regia, sodium hydroxide, ammonium hydroxide, calcium hydroxide, benzene, toluene, carbon tetrachloride, heptane, nonane, lower ketones and aldehydes, and similar materials and mixtures thereof. A limitation on the use of these carrier agents is that pyrolyzed shale oil hydrocarbons may be soluble therein resulting in additional recovery problems. However, solubilization of the hydrocarbon fraction in a carrier agent improves the yield of the product and may be justifiable. This consideration however, is not a limitation upon this invention.

The sonic energy is supplied in any convenient form and preferably by the activation of one or more transducer probes which have been placed in oil shale deposits on location in the subterranean chamber. The probe may be inserted into the chamber by means of passing the probe through a previously drilled shaft. The sonic energy used is preferably in the ultrasonic range with the recovery efficiency being proportional to the intensity of the sonic energy used. It is noted, however, that the cost of producing high intensity sonic energy is generally considerable and the economics of the situation may not justify expenditure of the full theoretical power needed for high speed operation. Since recovery of the hydrocarbon portion is at a slower rate when a lower intensity sonic energy is used, a balance determines the optimum operation rate. Frequencies of the order of about 10–1000 kilocycles per second are effective for recovery of hydrocarbons with a minimum of 16 kilocycles per second being needed for best results. Higher frequencies are also operative, however, the cost of reaching these frequencies may not be justified since the rate of the hydrocarbon recovery does not increase in the same proportion at higher levels. The sonic power requirement is in the order of 500–5000 watts per square centimeter or greater, of transmitting cross-sectional area.

The process requires no additional costs for raw materials since available water is preferred. Storage space, however, is provided and the proportion thereof is a function of the hydrocarbon material removed. Equally, the recovered carrier agent and recovered hydrocarbon fraction can be shipped or pumped to a recovery facility at a central or existing location.

An additional advantage of this process is that the heat generated by the activated probes in the shale deposit is used to furnish a portion of the generator power required. Heat may be recovered by exchange thereof in units at the surface in conventional manner as by heat exchangers and turbines.

The hydrocarbon materials and carrier agent may be removed from subterranean locations by pump means or by pressure means well known in the petroleum recovery arts.

To advantage, there is admixed with the carrier agent an emulsifying agent (or surfactant as otherwise generally known) to facilitate separation of the hydrocarbon portion of the shale oil from the mineral deposits and to promote emulsification of the hydrocarbons in the carrier agent under the influence of sonic energy. The emulsifying agent may be any of the well known available materials which include detergents, soaps, amine salts, quaternary ammonium compounds and polyether alcohols, sulfonates and sulfates. Specific examples include: diamyl sodium sulfosuccinate, sorbitan monolaurate, sodium 2-ethyl-n-heptyl sulfate, and the like.

Recovered yields of shale oil are substantially improved when the process is carried out in fragmented oil shale. Due to the enormity of the oil shale deposits, conventional methods of fragmentation such as standard explosives have not provided a generally satisfactory solution. However, detonation of nuclear devices for creation of subterranean caverns provides a method for causing the oil shale to fragmentize and fissure. Lekas et al.* have described a process for fracturing oil shale with nuclear explosives with an accompanying chimney effect in the subterranean cavern. The instant invention is used to advantage in such fragmentized oil shale by carrying out the process described in the resulting chimney. In a modification of this process, the carrier agent can be eliminated since the heat of the atomic detonation is sufficient to liquify freed hydrocarbons at substantial distances from the blast center. The hydrocarbon fraction is recovered by merely pumping the liquid hydrocarbons to the surface as disclosed by Lekas et al. This invention provides a unique method for more rapid and more efficient recovery of the shale oil.

Recovery of the hydrocarbon product from the added carrier agent is readily accomplished by means of quiescent storage of the removed fluids wherein the hydrocarbon fraction or portion separates from the carrier agent on standing. The recovery operation is simplified by merely skimming the lighter material from the top of the storage container or conversely removing the heavy material as the bottom layer. Other recovery procedures include congealing, liquid-liquid extraction, distillation or any other known method. Apparatus for these operations are well known.

The molecular weight of the recovered hydrocarbon product is determined and the various hydrocarbon fractions present therein are analyzed. The recovered hydrocarbon product has therein approximately up to about 30% by weight of pyrolyzed kerogen, including ring and linear hydrocarbons. For example, such materials comprise benzene and derivatives thereof and aliphatic compounds such as $C_3$–$C_{36}$ alkyl and unsaturated molecules, and also polymeric structures. Oxy and sulfur derivatives of these compounds are also present as well as amines derivatives.

The described process also has application: in recovery of petroleum and hydrocarbon values from tarsands by similar process; in the secondary recovery of petroleum residual oil by transmitting sonic energy into a strato of residual crude which has been flooded with a carrier agent such as water or brine and recovery as in the shale oil process; and, also in the recovery of asphaltic oil by similar process. The proportion of the pyrolyzed fraction is a function of the frequency and intensity of the sonic energy used and the length of time of exposure to the sonic energy; the greater the level of sonic energy used, the greater the proportion of cracked hydrocarbons present in the product.

The process of this invention is also useful in other areas where rupturing of molecular bonds is required in order to properly or efficiently operate a process. For example, in the cracking of petroleum crude oil, a carrier agent such as water is admixed with the crude in the cracking tower and subject to sonic energy while being maintained under quiescent conditions. As described above, a preferred embodiment includes a continuous process wherein a portion of the agent is removed subsequent to being treated by the sonic energy and, thereafter effectuating recovery of the petroleum portion from the removed agent. Continuous operation is highly desirable as for example, by continuously feeding fresh agent, continuously transmitting sonic energy into the system and continuously withdrawing a portion of the agent layer, and recovering the petroleum portion therefrom. In order to facilitate migration of the petroleum fraction into the agent layer an emulsifying agent as described is included in the agent. In the recovered petroleum portion, there is a high proportion of cracked hydrocarbon molecules substantially within the $C_2$–$C_{24}$ group of aliphatic compounds.

In another embodiment of this invention, higher molecular weight organic fuels are treated as described above with a carrier agent and sonic energy. The recovered product therefrom contains lower molecular weight molecules than originally found in the fuel. Since lower molecular weight hydrocarbons provide more caloric energy for a given weight than do higher molecular weight molecules for the same weight of fuel, this process provides a simplified method for imparting greater caloric energy to fuels. In one application of this embodiment of the invention, the sonic energy may be put into the fuel directly at the use site without the use of the carrier agent. This embodiment provides the advantage of transporting a relatively low-energy, low-volatility fuel, and converting that fuel into a high-volatility fuel having a higher caloric content immediately prior to its use. This also overcomes the problem of volatilization losses resulting from the handling of low molecular weight fuels.

Another embodiment of this invention includes a method and apparatus for removing higher molecular weight exhaust products of combustion from combustion engines, and particularly internal combustion engines. The products of combustion are mainly hot gases which may contain molecular structures having carcinogenic properties, as well as other atmospheric pollutants. Additives to the fuel generally contain organometallic compounds which add to the undesirable features of the combustion products. In this process the hot exhaust gases are passed through a chamber wherein a sonic probe transmits sonic energy into the gas stream. Preferably, a carrier agent is present at the chamber outlet such as water

---

*Lekas and Carpenter: "Fracturing Oil Shale With Nuclear Explosives For In-Situ Retorting," Quarterly of the Colorado School of Mines.

or an adsorbing agent such as carbon, e.i., granulated activated charcoal. Sonic energy causes the molecular rupture of the pollutants into lower molecular weight products thus facilitating more efficient retention of the combusion products by the agent; in particular, it retains lower molecular weight products resulting from the sonic energy treatment. A portion of the agent is preferably continuously removed, and separated into the agent and a concentrate of the hydrocarbon fuel, pyrolyzed products thereof, and fuel additives as described. Recovered combustible products may be recycled to the combustion engine for utilization together with the original fuel. Where a solid agent is used, removal and purification is required less frequently since the adsorbent capacity of the solid agent is substantially greater than the retention capacity of a fluid agent.

Figure 2:
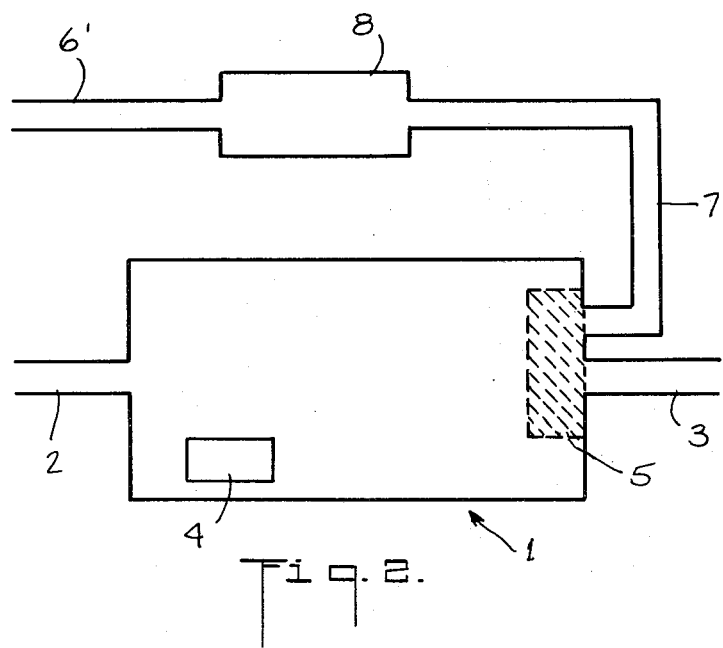
FIG. 2 illustrates an alternate embodiment of an apparatus for treating exhaust products of a combustion engine according to the invention.

Referring to FIGS. 1 and 2, the above-described apparatus includes a chamber 1, having an inlet 2 for exhaust products of combustion from a combustion engine (not shown) and an outlet 3. Located inside chamber 1 is a sonic transducer 4 for transmitting sonic energy into the exhaust gas stream. A carrier agent 5 located at the outlet of chamber 1 retains the lower molecular products resulting from the sonic energy treatment.

In the embodiment of FIG. 1, a recycle line 6 from the chamber prior to carrier agent 5 leads a major portion of the treated fumes back to the engine for recombustion, as described below in Example 4.

In the alternate embodiment of FIG. 2, a portion of the carrier agent is continuously removed through line 7 to a means 8 for separating the carrier agent from the retained treated exhaust products. Recovered combustible products are then recycled to the engine through line 6′.

In another embodiment of this invention, the capability of sonic energy to rupture molecular bonds is used to cause unique chemical reactions to proceed. For example, alkanes are reacted with organic acids to form the esters and hydrogen gas. Among the reactants are included $C_1$–$C_{36}$ alkanes, and mono, di-, and polycarboxylic acids of both the saturated and unsaturated type having up to 24 and more carbon atoms in its molecule in the monomeric state. Above about 24 carbon atoms the material is difficult to handle in this manner since it is a harder solid. Polymeric carboxylic acids may be used to advantage as may also polymeric alkanes such as polyethylene, polypropylene, and mixtures thereof. Examples of acids include acetic, butyric, acrylic, methacrylic, steric, maleic, phthalic, glutaric, pimelic, succinic, sebacic acid and the like, polyacrylic and polymethacrylic acid are a'so used to advantage. Also operative are multi-functional organic molecules having an acid moiety thereon such as hydroxy acids.

The process comprises admixing the reactants in a vessel and submitting the combination to sonic energy. In one example, acetic acid and butane were reacted to form butyl acetate by treating an admixture of these compounds in a vessel with ultrasonic energy having a frequency of 28.3 kilocycles per second and an intensity of between 50–100 watts per square centimeter while maintaining a pressure of about 100 pounds per square inch and a temperature of 572° F.

In another embodiment, metal containing ores are mined to free the metal by flooding a mine, such as a gold mine, with a carrier agent such as water. The ore is then subjected to sonic energy, as described above. The disruptive forces due to the sonic energy input tends to free the metal from the mineral matter and facilities recovery of the metal. In the absence of the carrier agent, the process is less efficient, and recovery is made by mechanically separating the loosened metal.

The following is a related embodiment of the process described. Shale is impermeable and has an extremely low porosity thereby lending itself to be used as a piezoelectric transducer. Slant channnuels are drilled into a suitable shale strata and are flooded with a carrier agent as described into which a surfactant has been added. Transmission lines are connected to the shale. Generators are activated and the electrical energy is passed through the transmission lines into the shale strata. The shale strata resonates at a frequency peculiar in itself and destroys itself. The kerogen and/or patroleum products pass into the agent and the agent is forced to the surface by displacement with additional agent. The products are separated from the agent and recycled.

In the examples that follow, and elsewhere herein, the proportions are by weight unless specifically stated to the contrary.

EXAMPLE 1

A 3 lb. sample of oil shale containing about 60% inorganic mineral material, the balance being kerogen, is placed in a stainless steel chamber approximately 6 inches cube. Water and sorbitan monolaurate surfactant are added to the container so that the entire sample is immersed. A water inlet line is provided in the top of the chamber and a discharge line is provided near the bottom of the chamber. Transducer probe elements are placed into cavities in the shale oil and secured in place. Appropriate pumps are positioned in the water inlet and discharged lines for circulation purposes. The discharge line empties into a storage chamber of approximately 10 cubic feet. The storage container is provided with draw-off lines for the layers of the hydrocarbon materials as they separate therein. The transducer element is activated and samples of water are transported from the water discharge line to the storage chamber. Fresh water is added (or recovered water from the storage-separation container) through the water inlet line to replenish the samples removed. The sonic energy input is varied over the range of 10–1500 kilocycles per second. During the operation of the process, the temperature rises due to the vibrational energy put into the system.

Samples taken in the lower frequency range have minor proportions of hydrocarbon products. As the frequency level is raised, however, the proportion of hydrocarbon products is increased. Over about 1000 kilocycles per second, the rate of increase of the hydrocarbon products falls off and is no longer in about proportional relation with increased frequency.

The hydrocarbon product contains both aromatic and aliphatic compounds, and oxygen, sulphur, and nitrogen derivatives thereof. Also, the proportion of polymerized and higher molecular weight materials significantly decreases with increasing frequency. Added surfactants improve recovery yields.

EXAMPLE 2

This example describes cracking of crude petroleum oil with sonic energy in the absence of catalyst. Into a simulated cracking tower of laboratory scale is added crude oil to about one-third of the capacity. Water is added to an additional one-third of the capacity. Temperatures are increased within the range of 100°–200° F. and maintained. Sonic probes are inserted into the oil-water system. The process steps described above for the shale oil recovery are repeated in this example by taking samples at various energy levels. The hydrocarbon product analysis shows a substantially high proportion of $C_2$–$C_{16}$ aliphatic compounds in general proportional relationship to the frequency level and the time of exposure.

In a modification of this example, a low molecular weight solvent, hexane, is substituted for the water. Similar good results are obtained.

In another modification, a carrier agent is not used and the crude oil is sampled after various periods of exposure to the sonic energy. The sampled crude has a similar proportion of pyrolyzed hydrocarbons as found in the carrier agent samples described.

EXAMPLE 3

A fuel oil comprising substantially $C_6$–$C_9$ aliphatic hydrocarbons is treated with sonic energy by means of a probe within the frequency range described above for periods of time in the range of between 1-60 minutes per pound of fuel. At the end of various periods of time, the fuel is analyzed. With increasing time, frequency, and intensity, the proportion of $C_1$–$C_5$ aliphatic hydrocarbons is increased. In a modification of this example, the higher molecular weight fuel is continuously fed into a transducer containing chamber. The transducer is activated and portions of the fuel are continuously removed therefrom. The removed fuel has a substantially increased proportion of lower molecular weight hydrocarbons therein. The longer the fuel is exposed to the activated transducer and also the higher the frequency of the sonic energy introduced into the fuel, the greater is the proportion of lower molecular weight material.

EXAMPLE 4

In this example, combustion product of fuels of an internal combustion engine such as gasoline engine are passed through a transducer element containing chamber at the outlet of which is placed charcoal. The transducer is activated to emit sonic energy in the range of between 10–1500 kilocycles per second. The exhaust fumes are retained by the charcoal. Analysis of the fumes retained by the charcoal shows a substantial proportion of lower molecular weight products compared with the combustion products as directly exhausted from the engine prior to the passage through the sonic chamber. In a modification of this example, water is substituted for the charcoal. Results analogous to the charcoal system are obtained.

In modification of this Example, a recycle line is included prior to the charcoal or water. The recycle line feeds a major portion of the fumes directly back into the engine for further combustion.

EXAMPLE 5

In a process similar to the embodiment described for metal recovery from metal-containing ores, sonic probes are placed in cavities in subterranean strata containing either or both natural gas and residual crude oil which is trapped in the pores of the strata. The probes are activated and sonic energy in the range of between 10–1500 kilocycles per second is transmitted into the hydrocarbon containing strata. The sonic energy, in proportion to its frequency, intensity and duration causes fissures and cracks the strata formation, thereby freeing the hydrocarbon for more efficient secondary recovery by usual methods such as by pumping or pressurization recovery.

Above about 1000 kilocycles per second the rate of fissuring falls off decreasing the efficiency of the process.

It will be understood that it is intended to cover all changes and modifications of the examples of the invention herein chosen for the purpose of illustration which do not constitute departures from the spirit and scope of the invention. It will be further understood that the Abstract of Disclosure is included in this specification solely for the purposes of Rule 72(b) of the Rules of Practice of the U.S. Patent Office.

What is claimed is:

1. An apparatus for removing substantial portions of higher molecular weight exhaust products of combustion including hydrocarbon fuel, pyrolyzed products thereof and organometallic fuel additive compounds from combustion engines comprising:
    (a) a chamber having an inlet for attachment to the exhaust line of a combustion engine for receiving the exhaust materials of combustion from the combustion engine and an outlet for discharging treated exhaust gases from the chamber;
    (b) a transducer element within the chamber for transmitting sonic energy into the exhaust gas stream as it passes through the chamber, the sonic energy being of sufficient intensity to rupture the molecules of hydrocarbon fuel, pyrolyzed products thereof and organometallic compounds in the exhaust materials of combustion from the combustion engine into lower molecular weight components of said molecules;
    (c) carrier agent comprising a material adapted to retain said lower molecular weight components of said molecules when contacted thereby, said carrier agent being located within said chamber at the chamber outlet in a position for contacting substantially all of the exhaust gas stream as it flows toward the outlet for retaining a substantial portion of said lower molecular weight components resulting from the sonic energy treatment while permitting the remainder of the treated exhaust gases to be discharged from the chamber; and
    (d) a recycle line connected at one end to a second outlet from the chamber located upstream of the location of said carrier agent and adapted to be connected at the other end to the fuel inlet line of the combustion engine for returning a major portion of the treated fumes prior to contacting said carrier agent directly back to the engine for further combustion.

2. The apparatus of claim 1 wherein the transducer emits sonic energy in the frequency range from 10 to 1500 kilocycles per second.

3. The apparatus of claim 1 wherein the carrier agent is water.

4. The apparatus of claim 1 wherein the carrier agent is charcoal.

5. An apparatus for removing substantial portions of higher molecular weight exhaust products of combustion including hydrocarbon fuel, pyrolyzed products thereof and organometallic fuel additive compounds from combustion engines comprising:
    (a) a chamber having an inlet for attachment to the exhaust line of a combustion engine for receiving the exhaust materials of combustion from the combustion engine and an outlet for discharging treated exhaust gases from the chamber;
    (b) a transducer element within the chamber for transmitting sonic energy into the exhaust gas stream as it passes through the chamber, the sonic energy being of sufficient intensity to rupture the molecules of hydrocarbon fuel, pyrolyzed products thereof and organometallic compounds in the exhaust materials of combustion from the combustion engine into lower molecular weight components of said molecules;
    (c) a carrier agent comprising a material adapted to retain said lower molecular weight components of said molecules when contacted thereby, said carrier agent being located within said chamber at the chamber outlet in a position for contacting substantially all of the exhaust gas stream as it flows toward the outlet for retaining a substantial portion of said lower molecular weight components resulting from the sonic energy treatment while permitting the remainder of the treated exhaust gases to be discharged from the chamber;
    (d) means connected to the chamber for continuously removing a portion of the carrier agent from the chamber; and
    (e) means connected to the carrier agent removing means for separating a concentrate of the hydrocarbon fuel, pyrolyzed products thereof and fuel additives from the removed carrier agent.

6. The apparatus of claim 5 further comprising:
    a recycle line connected at one end to the separating means and adapted to be connected at the other end to the fuel inlet line of a combustion engine for returning said separated concentrate to the engine for utilizing recovered combustible products together with the original fuel.

(References on following page)

References Cited

UNITED STATES PATENTS

| | | | |
|---|---|---|---|
| 1,695,554 | 12/1928 | Markels | 55—DIG 30 |
| 2,584,674 | 2/1952 | Costa | 60—278 |
| 3,186,392 | 6/1965 | Gregoric | 60—275 |
| 3,201,338 | 8/1965 | Pennington | 55—277 |
| 3,254,484 | 6/1966 | Kopper | 60—275 |
| 3,353,335 | 11/1967 | Caballero | 55—DIG 30 |

BERNARD NOZICK, Primary Examiner

U.S. Cl. X.R.

23—252 B; 55—220, 277, 387, DIG 30; 60—275, 279